Jan. 21, 1958   W. M. McCONNELL   2,820,573
PIPE HANDLING MECHANISM
Filed Sept. 19, 1955   3 Sheets-Sheet 1
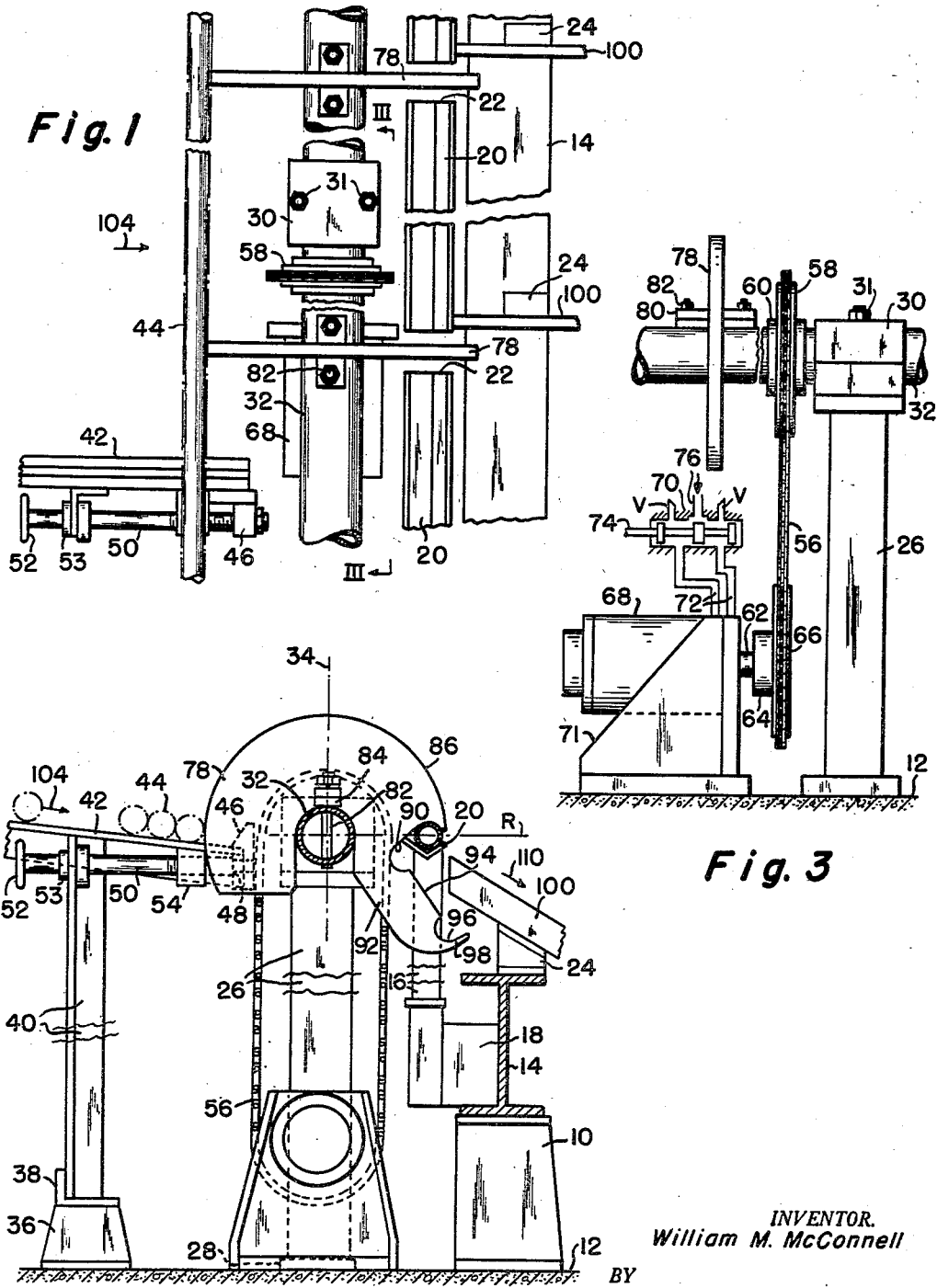
INVENTOR.
William M. McConnell
BY Webb, Mackey & Burden
HIS ATTORNEYS INVENTOR.
William M. McConnell Jan. 21, 1958     W. M. McCONNELL     2,820,573
PIPE HANDLING MECHANISM
Filed Sept. 19, 1955                             3 Sheets-Sheet 3
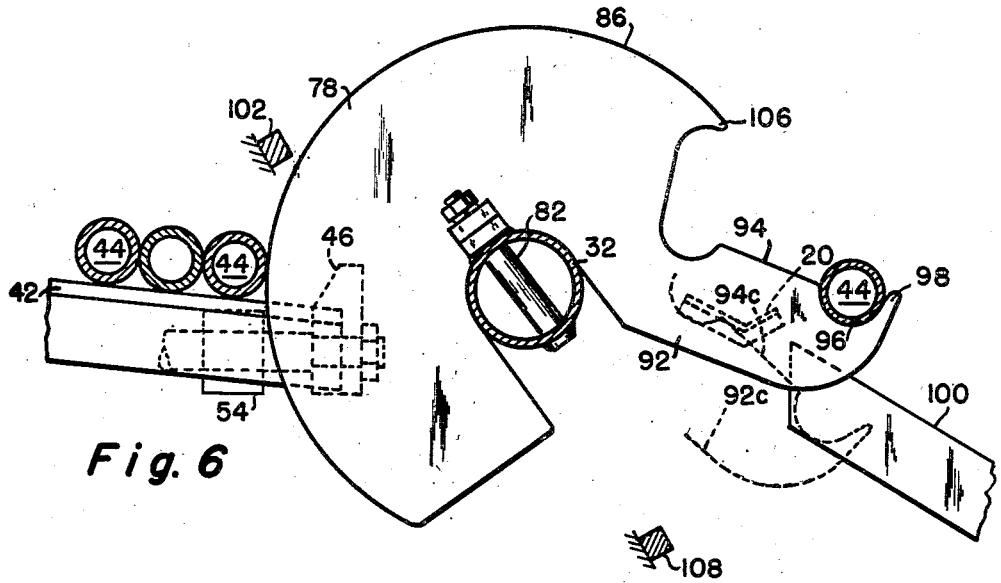
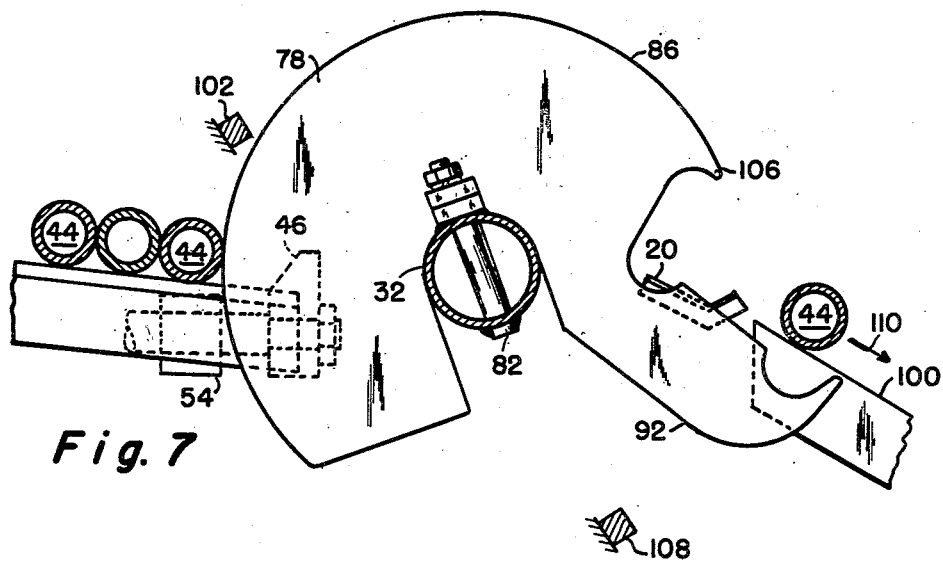
INVENTOR.
William M. McConnell
BY
Webb, Mackey, & Burden
HIS ATTORNEYS

United States Patent Office 2,820,573
Patented Jan. 21, 1958

2,820,573

PIPE HANDLING MECHANISM

William M. McConnell, McKeesport, Pa., assignor to Taylor-Wilson Manufacturing Company, McKees Rocks, Pa., a corporation of Pennsylvania Application September 19, 1955, Serial No. 535,081

13 Claims. (Cl. 221—238)

The present invention relates to pipe handling apparatus for lifting pipe from one station, transferring the pipe to a stationary support at a second station, clamping the pipe to the support so as to hold down the same during an operation on the pipe, kicking out the pipe from the support following the operation and retaining the same in a poised position following kick-out, and finally, releasing the pipe for disposal. One basic moving part, acting in unison with identical companion parts and having an appropriate power driving mechanism therefor, entirely accomplishes the foregoing handling steps in the present apparatus. The above-mentioned operation performed upon the pipe in the noted clamping step may consist of a pipe testing operation or else a pipe expanding and testing operation such as produced in the pipe expansion apparatus of my copending patent application Serial No. 555,149, filed December 23, 1955. In fact, the present apparatus is particularly useful in conjunction with my expansion apparatus.

In past known pipe testing and pipe expanding apparatus in which pipe is inserted for testing and then removed following testing, one or a series of driven pipe handling wheels is customarily employed having a succession of peripheral notches formed therein to be individually occupied by the pieces of pipe to be tested and then removed from the apparatus. Separate hooks or belts encompassing each wheel and moving therewith are employed in many examples of this past known apparatus, and the hooks or belts clamp and hold the pipe sections firmly seated in their notches and then are subsequently released at an appropriate time to permit the sections to leave the notches, preferably by gravity. At least two and sometimes several different kinds of moving parts are required in prior machines merely to engage and handle the pipe for the noted purpose. The present apparatus has one or more identical machine elements which form the sole moving pipe-engaging parts and which are arranged and operated by means of selectively reversible power driving mechanism in a novel fashion whereby the transfer and the clamping and the kick-out and the release of the pipe is inherent in the function of the moving part as it is selectively driven in opposite directions.

Various features, objects, and advantages of the present improved pipe handling apparatus will either be specifically pointed out or become apparent when, for a better understanding of the invention, reference is made to the following description taken in conjunction with the accompanying drawings, in which:

Figure 1 is a top plan view of the present pipe handling apparatus;

Figure 2 is an end elevational view;

Figure 3 is a front elevational view taken along the section lines III—III of Figure 1; and Figures 4, 5, 6, and 7 are sequential views illustrating the operation of the basic moving part of the apparatus.

Figure 4:
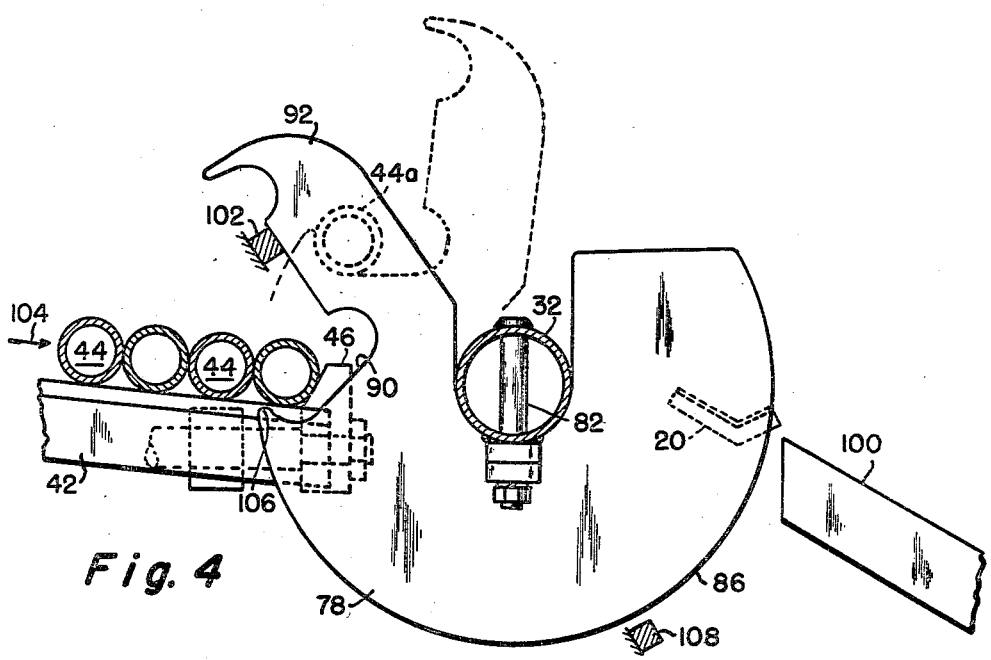

In more particular regard to the drawings, Figures 1, 2, and 3 show a row of spaced-apart pedestals 10 supported on a suitable platform or concrete floor 12 and commonly carrying a generally horizontally disposed I-beam 14. A row of saddle columns 16 is disposed at one side of and offset along the length of the I-beam 14 and each of the saddle columns is connected to the latter by means of an individual foot bracket 18. The saddle columns 16 support, at their upper ends, the interrupted lengths of an angle sectioned, horizontally disposed saddle member 20 having gaps, as at 22, between the successive longitudinally aligned lengths thereof. The angle cross section of the saddle member 20 consists of a relatively short leg portion extending diagonally upwardly and to the right in Figure 2 and a long leg portion joined thereto which extends diagonally upwardly and to the left, so as to define in the included angle therebetween a shallow pipe receiving recess. The included angle between the leg portions may equal approximately 135 degrees. The saddle 20 may be of the type incorporated in the pipe expansion apparatus of my noted copending application Serial No. 555,149, filed December 23, 1955, which latter further includes two relatively shiftable sealing heads, not shown but located at the opposite ends of the saddle for internally pressuring pipe thereon.

The I-beam 14 further carries a plurality of skid support brackets 24 upon the top surface thereof. A row of bearing pedestals 26, which may be tubular columns, is arranged with each pedestal provided with a base 28 at the lower end thereof which is anchored to the concrete floor 12. At their upper ends, each of the bearing pedestals 26 carries the upper and lower split halves of one of a series of rockshaft bearings 30 which are assembled and fastened by means of a pair of bolts 31 and in which a hollow rockshaft 32 is journably supported for rotation at spaced-apart points along the length of the latter. The row of bearing pedestals 26 occupies a common vertical plane 34 containing the axis of oscillation of the rockshaft 32. On the side of the vertical plane 34 opposite from where the I-beam 14 is located, another row of pedestals 36 parallel thereto is anchored to the floor 12, and each of the pedestals 36 carries a support bracket 38. The pedestals 36 are several in number and, by means of the support brackets 38, they support a like number of angle member uprights 40 which are likewise disposed in a row parallel to the I-beam 14 and to the plane 34 of the bearing pedestals. At their upper end, each of the uprights 40 carries one end of a feed skid 42 which slopes diagonally inwardly and to the right, Figure 2, and which cooperates with similar feed skids in the diagonal plane thereof to support a plurality of transversely disposed sections of pipe 44 at spaced-apart points along the length of the latter. A beveled pipe stop 46 is connected by means of a bearing 48 to the journaled end of a screw member 50 which is manually adjustable by means of a hand wheel 52 to adjust the position of the stop 46 horizontally along the axis of the screw member 50. The screw member 50 is threadedly received in a stationary nut 54 which is rigidly affixed to an adjacent one of the feed skids 42. A bracket supported bearing 53 rigid with the adjacent upright 40 carries the screw member 50 at a point adjacent the hand wheel 52 but inwardly thereof.

A drive chain 56 for the rockshaft is trained over an upper sprocket 58 to drive the latter, the sprocket having a hub 60 splined directly to the rockshaft 32. A pneumatic motor shaft 62 splinedly carries the hub 64 of a lower sprocket 66 which drives the chain 56. The motor shaft 62 forms the torque output member of a reversible pneumatic motor 68 having a pneumatic control valve 70 therefor. A motor support bracket 71, anchored to the floor 12, carries the motor 68. The motor 68 has a pair of air pipes 72 which are selectively pressurizable to cause the motor to rotate the torque shaft 62 in one direction or the other. The valve 70 which controls the air pipes 72 includes a positionable three-spool valve element controlled in known manner by means of a positioning shaft 74 to selectively apply pressure fluid, such as air, from a compressed air supply pipe 76 to either one of the motor pipes 72 and simultaneously connecting the other pipe to an adjacent vent V, Figure 3. The three-spool valve element is shiftable in the valve 70 from a neutral position to either one of two opposite operating positions.

A plurality of pipe handling plates, two of which are shown at 78, is provided, and each of the plates has an axially extending pair of opposite lateral lugs 80 which are secured, as by means of a plurality of bolts 82, to the rockshaft 32. Each of the bolts 82 extends completely through the rockshaft 32, which may be a hollow tube, and clamps one of the lugs 80 against a short bar 84 which is welded to the exterior surface of the rockshaft 32 and which extends axially in the direction thereof.

Each of the pipe handling plates 78 includes a circular portion 86 which extends around the circumference thereof for an arcuate distance of greater than 180 degrees, for instance 200 degrees. At the anterior end of the arcuate portion 86, a chordally directed slot 90 is formed in the plate 78 and, at one end, intersects the arcuate portion 86 and extends diagonally forwardly and radially inwardly therefrom to a point of intersection with a generally radially extending kick-out arm 92 formed integrally with the plate 78. The slot 90 is of the same width as the diameter of the outside of the pipes 44 and the slot is somewhat elongated, such that the axis of the slot forms an angle of approximately 135 degrees with a radius R drawn through the point of intersection of the circle-like arcuate portion 86 and the slot 90. The kick-out arms 92 on the plates 78 are disposed in a manner to swing transversely through the gaps, such as at 22, Figure 1, between the consecutive lengths of the saddle 20. The point of intersection between the slot 90 and the base of the kick-out arm 92 is occupied by a cam nose portion 94. The outer end of the kick-out arm 92 is provided with a pipe receiving recess 96 which, at the outer end thereof at the extremity of the recess, carries a hook-like lug 98. Adjacent the kick-out arm 92, in the position shown in Figure 2 and immediately to the right thereof, a series of run-out skids 100 is provided, each of which is supported by means of one of the support brackets 24 mounted to the I-beam 14. The run-out skids 100 slope diagonally downwardly and to the right, as viewed in Figure 2.

The pipe handling plates 78 of Figures 1 through 3 are operated in unison from the common motor driven rockshaft 32 in a manner to lift and transfer pieces of pipe 44 upwardly and over from the feed skids 42 to the saddle 20. Immediately thereafter, the plates 78 clamp the individual pieces of pipe in the shallow recess formed in the saddle 20 for a subsequent pipe testing operation or operations, for instance by means of the pipe testing apparatus of my noted copending application Serial No. 555,149, filed December 23, 1956. After the operation or operations on the pipe, the plates 78 are reversely rotated to cause the cam nose 94 on the arm 92 to kick out or lift the pipe out of the saddle 20 and then engage the latter as it occupies the recess 96 at the outer end of the kick-out arm 92. Then the plate 78 is reversely rotated to lower the kick-out arm 92 and transfer the weight of the pipe from a poised position off the end of the hook 98 onto the diagonlly downwardly sloping run-out skids 100 for disposal. As viewed in Figure 2, the plates 78 in unison undergo, in sequence, a clockwise transfer and clamping motion to the right, a short counterclockwise kick-out motion to the left, and a short pipe disposing motion to the run-out skids 100 in a clockwise direction. There following, the plates 78 are rotated counterclockwise approximately 180 degrees to the left in order to receive, lift, and transfer another piece of pipe 44 from the feed skids 42 for an additional cycle. During all motions but the latter motion mentioned, the circular portion 86 on the plate holds the pieces of pipe 44 in a static displaced position away from the stop 46. The pieces of pipe, one at a time, can roll against and engage the stop 46 only when the plate 78 occupies a position wherein the slot 90 is in horizontal alignment with and on the same side of the plane 34 with the feed skids 42.

The quick reversals from clockwise to counterclockwise motion and back of the rockshaft 32 are readily accomplished by the pneumatic reversible motor 68, under instant control of the control valve 70. During the clamping action of pipe against the saddle member by means of the plate 78, the valve 70 is held in one extreme operating position and a substantial torque is generated by means of the pneumatic motor 68.

For a fuller understanding of the clamping action and of the further operation of the plates 78, reference may be had to sequential Figures 4–7, a description of each of which follows.

In Figure 4, one of the plates 78 is shown occupying its extreme counterclockwise position in which the kick-out arm 92 may engage a limit stop 102 provided on the stationary frame of the present handling apparatus. The pieces of pipe 44 under the action of gravity tend to roll in the direction of the arrow 104 along the feed skids 42 to a point at which the innermost piece of pipe engages the adjustable stop 46. Thereafter, clockwise motion of the kick-out arms 92, away from the stationary stop 102, is accompanied by corresponding motion of a piece of pipe 44 which occupies the outer posterior end of the slot 90. A hook-like lug 106, located at the point of intersection between the slot 90 and the circular portion 86, prevents the pipe from rolling radially outwardly and leaving the end of the slot 90. Counterclockwise movement of the arm 92 and the disc 78 which carries the same causes the pipe 44 in the slot 90 to advance through the intermediate dotted line position 44a, Figure 4.

Figure 5:
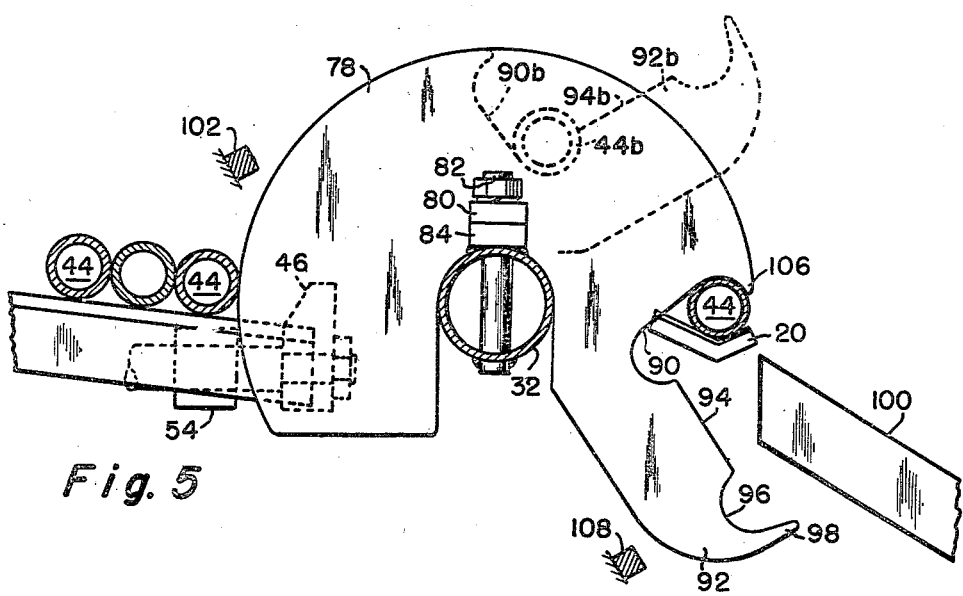

In Figure 5, the kick-out arm 92 is shown in a solid line position, from which it has rotatably advanced from a preceding dotted line position 92b. The piece of pipe slidably advances in the slot 90 by gravity around the plate 78 to the position 44b at the anterior inner end of the slot shown at 90b in dotted lines, from the relative position shown by the dotted lines 44a in Figure 4. During rotation of the kickout arm 92 from the dotted line position 92b to the solid line position of Figure 5, the piece of pipe 44 being carried in the slot 90 is transferred to the saddle 20, so as to slidably retransfer from the anterior inner end of the slot to the posterior outer end adjacent the lug 106. An emergency stationary stop 108 may be provided at a closely spaced point adjacent the last few degrees of swing of the kick-out arm 92 to prevent unwanted descending overtravel of the plate 78, in the event that no pipe to be clamped thereby occupies the slot 90. Normally, however, a piece of pipe 44 is thus clamped between the stationary saddle 20 and the posterior outer end of the slot 90 and, under constant torque of the valve controlled pneumatic motor 68, the pipe 44 is held fast for an appropriate operation performed by other apparatus associated with the saddle 20. Reversal of the motor 68 causes counterclockwise rotation of the plate 78, so as to release the clamped pipe 44 following the operation.

In the transition period between the positions of Figures 5 and 6, respectively, the kick-out arm 92 rotates counterclockwise so as to assume a dotted line intermediate position 92c, Figure 6, in which the cam nose 94 assumes the dotted line position 94c, Figure 6, to engage and kick out the piece of pipe 44 laterally and upwardly from the shallow recess in the saddle 20. The pipe 44 is then lifted upwardly and rolls outwardly along the kick-out arm 92 as the latter rotates counterclockwise and ascends into the solid line position 92 of Figure 6. Rolling along the upper edge of the arm 92, the pipe 44 enters the recess 96 adjacent the hook-like lug 98 at the outer extremity thereof. The lug 98 holds the pipe 44 in a poised position above the run-out skids 100 after the arm stops in the solid line position of Figure 6. Thereafter the driving motor is reversed and the plate 78 is rotated clockwise to a position for disposing of the pipe 44 and transferring the weight thereof to the run-out skids 100.

In Figure 7, the transfer and final disposition of the pipe 44 into the run-out skids 100 is represented. The kick-out arm 92 occupies a solid line descended position corresponding generally to the solid line position of the kick-out arm in Figure 5, preceding. The transfer of the pipe 44 to the run-out skids 100 results in motion of the pipe under gravity in the direction of the diagonal arrow 110, Figure 7. Then the motor 68 is reversed and the disc 78 is rotated counterclockwise for restoration to the position of Figure 4, previously considered. During rotation between and toward any position except the position of Figure 4, the arc-shaped portion 86 of the plate 78 engages and holds the pipes 44 in a position on the feed skids 42 wherein they are ready to enter the slot 90 at any time at which the plate assumes the solid line position of Figure 4.

As herein disclosed, the pipe handling apparatus is shown to incorporate a relatively thin oscillatable plate driven separately along a rockshaft in unison with other thin plates for engaging and handling pieces of pipe at spacer-apart points along the pipe. It is evident that only two thin spaced-apart plates are necessary for shorter length of pipe and that, for very short pieces of pipe or tubes or tubular cans, only a single oscillatable plate of substantial thickness will be satisfactory.

While I have described certain present preferred embodiments of my invention, it is to be understood that it may be otherwise embodied within the scope of the appended claims.

I claim:

1. Article handling apparatus comprising a rockshaft, notched disc means mounted thereto and having a kick-out arm provided adjacent one peripheral notch in said disc means and oscillatable between the opposite sides of the shaft receiving means at one of said sides of the shaft having a shallow recess for receiving articles clamped therein from the notch when the kick-out arm descends at that side, skid means at the named side for receiving the articles disposed from the kick-out arm after the latter rises to kick out the articles, and reversing drive means effective to drive the disk means successively in a long transfer and clamping motion in a first direction, a short reverse kick-out motion, and a short article disposing motion in the first direction again.

2. Article handling means comprising a rockshaft, a plurality of disc means mounted thereto and each having a kick-out arm adjacent article carrying means formed thereon and oscillatable between the opposite sides of the shaft, means at one of said sides for individually delivering articles into said article carrying means, supported means at the other of said sides having a shallow recess for receiving an article from the article carrying means when the kick-out arms descend at that side, and drive means connected to the disk means to drive the kick-out arms thereon and reversible so that the latter cyclically reverse and rise to kick out articles from the shallow recess.

3. In a machine for handling tubular articles, an arm-carrying member mounted for rocking movement between an article input side and an opposite side thereof, said member having an arcuate marginal portion and a slot structure intersecting said marginal portion and said arm structure and extending diagonally inwardly and forwardly from the former in the direction of the arm structure so as to intersect it, with the juncture at the common inner end of the two structures, and an article-retaining hook portion on the outer end of each of said slot and arm structures.

4. In a machine for handling tubular articles, an arm-carrying member mounted for rocking movement between an article input side and an opposite side thereof, said member having an arcuate marginal portion and having a radially outwardly offset article-retaining hook portion formed on the arm, a slot intersecting said marginal portion and an inner point on said arm and extending diagonally inwardly and forwardly from the former in the direction of the latter, and a second article-retaining hook portion located at a radially intermediate point at the juncture between the slot and said marginal portion for retaining articles in said slot.

5. In a machine for handling tubular articles, an arm-carrying member mounted for rocking movement between an article input side and an opposite side thereof, said member having an arcuate marginal portion, a slot intersecting said marginal portion and said arm and extending diagonally inwardly and forwardly from the former in the direction of the latter, and an article-engaging cam portion disposed at the juncture between said slot and said arm for kicking out articles from a saddle adjacent said slot.

6. In a machine for handling tubular articles, an arm-carrying member mounted for rocking movement between an article input side and an opposite side thereof, said member having an arcuate marginal portion, a slot intersecting said marginal portion and said arm and extending diagonally inwardly and forwardly from the former in the direction of the latter, and a hook portion at the end of said arm for retaining articles thereupon discharged from said slot.

7. In a machine for handling tubular articles, an arm-carrying member mounted for rocking movement between an article input side and an opposite side thereof, said member having a chordally directed article receiving slot intersecting said arm and provided with a nose portion at the end of said arm for retaining articles thereupon discharged from said slot.

8. In combination, a generally horizontally disposed rockshaft, article transfer means carried by the rockshaft to move in one direction for receiving articles and to move in the reverse direction for lifting and transferring articles from one side of the vertical plane of the shaft to the other side, article support means in the path of transfer of said articles and disposed on said other side of the plane of the shaft, and reversible torque developing means for rotating the rockshaft in said one direction to receive an article and then operable to oscillate it in the reverse direction aforesaid with an article being transferred from one side of the plane to the other side, and effective to exert in said reverse direction of oscillation a predetermined clamping torque upon that article trapped between the transfer means and the support means.

9. In combination, a member mounted for rocking movement about a generally horizontal axis, reversible torque developing means drivingly connected thereto, article transfer means carried by the member for lifting and transferring articles from one side of the vertical plane containing said axis to the opposite side, said article transfer means having an article receiving slot wherein each article bodily shifts from one end of the slot to the other during the transfer of the article, and saddle means located at said opposite side of said vertical plane against which the article is clamped at said one end of the slot under predetermined torque developed by said reversible means.

10. Transfer means comprising a transfer member mounted for rocking movement, said member having an uninterrupted portion at least semi-circular in extent and further having article receiving and article kick-out arm portions at the forward end of said semi-circular portion, a feed skid at one side of said transfer member for holding a column of intermittently rolling articles awaiting transfer, and means to oscillate said member successively in a first transfer and clamping movement toward a support with an article from the skid held in said receiving portion on the transfer member, and in a first reversal kick-out motion in which the weight of the article transfers from the support to the kick-out arm portion, and in a second reversal article disposing motion from the arm portion, said semi-circular portion on the transfer member having an effective position of continuous wiping contact with the articles awaiting transfer entirely throughout said reversals of motion and also effective during said first movement which is substantially longer than the rest.

11. A handling device comprising a transfer member mounted for oscillatory movement, said member having an uninterrupted portion at least semi-circular in extent and further having article receiving and kick-out arm portions at the forward end of the semi-circular portion, a feed skid at one side of said transfer member for holding a column of intermittently rolling articles awaiting transfer, means to oscillate said member successively in a first transfer and clamping motion toward a support with an article from the skid held in said receiving portion on the transfer member and in a first reversal kick-out motion in which the weight of the article transfers from the support to the kick-out arm portion and in a second reversal article disposing motion from the arm portion, and a stop on the feed skid associated with the semi-circular portion on the transfer member which has an effective position of continuous wiping contact with the articles awaiting transfer so as to hold them in static displaced positions away from the stop throughout said reversals of motion and similarly effective during said first motion which is substantially longer than the rest.

12. In a machine for handling rolling articles, a pair of fixed spaced supports, a shiftable device having a clamping portion which cooperates with one of said supports to clamp an article fast thereto, repetitively reversing means connected to shift the device and effective to establish said cooperative clamping action in one direction of shift and to release the clamping action when first reversed, an arm on said device to which the weight of the article transfers during first reversed movement, and pockets formed with side margins on said arm which cause the article to be first introduced thereupon during said first reversal of movement and which cooperate with the other support so as to next deposit the weight of the article thereupon during the second reversed movement of the device by said means.

13. A transfer device comprising disk means rotatable to move a rolling article from one side of the device to the other, a diagonal transfer slot which extends deeper into the periphery of the disk means at one end than the other, a clamping rest fixed in the path of rotation of the disk means, said deeper end being formed in the normally leading end of the transfer slot, and means to mount the disk means for rotation under torque in the normal direction aforesaid such that the shallow end of the slot is the trailing end to insure that an article captured by the clamp rest from the leading deeper end of the slot will inherently lie in a collision path with the shallow end therein for solid clamping contact with the clamping rest.

References Cited in the file of this patent
UNITED STATES PATENTS 2,263,811     Lipkin _____ Nov. 25, 1941

U. S. DEPARTMENT OF COMMERCE
PATENT OFFICE

CERTIFICATE OF CORRECTION

Patent No. 2,820,573  January 21, 1958

William M. McConnell

It is hereby certified that error appears in the printed specification of the above numbered patent requiring correction and that the said Letters Patent should read as corrected below.

Column 3, line 58, for "December 23, 1956" read --December 23, 1955--; line 65, for "diagonlly" read --diagonally--; column 5, line 26, for "spacer" read --spaced--; line 28, for "length" read --lengths--; line 54, for "supported" read --support--.

Signed and sealed this 11th day of March 1958.

(SEAL)
Attest:
KARL H. AXLINE
Attesting Officer

ROBERT C. WATSON
Commissioner of Patents